(12) United States Patent
Velinov et al.

(10) Patent No.: US 10,088,075 B2
(45) Date of Patent: Oct. 2, 2018

(54) DISPOSABLE DIAPHRAGM VALVE

(71) Applicant: DELAWARE CAPITAL FORMATION, INC., Wilmington, DE (US)

(72) Inventors: Mario Velinov, Burbank, CA (US); Andrew Parker, San Juan Capistrano, CA (US); Charles Lam, Santa Ana, CA (US); Lawrence Martin, Littlerock, CA (US); Can T La, Stanton, CA (US)

(73) Assignee: OK International Inc., Garden Grove, CA (US)

( * ) Notice: Subject to any disclaimer, the term of this patent is extended or adjusted under 35 U.S.C. 154(b) by 41 days.

(21) Appl. No.: 14/831,730

(22) Filed: Aug. 20, 2015

(65) Prior Publication Data
US 2017/0051846 A1 Feb. 23, 2017

(51) Int. Cl.
| F16K 27/02 | (2006.01) |
| F04B 53/10 | (2006.01) |
| F04B 15/02 | (2006.01) |
| F16K 99/00 | (2006.01) |
| F16K 7/12 | (2006.01) |
| B05C 5/02 | (2006.01) |

(52) U.S. Cl.
CPC ........ F16K 99/0015 (2013.01); B05C 5/0237 (2013.01); F04B 15/02 (2013.01); F04B 53/106 (2013.01); F16K 7/123 (2013.01); F16K 27/0236 (2013.01); F16K 99/0055 (2013.01)

(58) Field of Classification Search
CPC ............. F16K 99/0015; F16K 99/0055; B05C 5/0237

USPC .......... 251/61–63.6, 122–123, 126; 222/213, 222/214, 413; 137/315.11, 315.27, 137/315.28

See application file for complete search history.

(56) References Cited

U.S. PATENT DOCUMENTS

| 2,397,373 A | 3/1946 | Saunders |
| 2,638,109 A | 5/1953 | Wahlmark |
| 3,790,040 A | 2/1974 | Bahr et al. |
| 4,930,669 A * | 6/1990 | Dickau ................... B05B 1/304 222/309 |

(Continued)

FOREIGN PATENT DOCUMENTS

| CN | 201 267 678 | 7/2009 |
| CN | 201902604 U | 7/2011 |

(Continued)

OTHER PUBLICATIONS

Extended European Search Report issued in parallel EP Application No. 15194109.3 dated Jan. 13, 2017, 8 pages.

(Continued)

*Primary Examiner* — Marina Tietjen
(74) *Attorney, Agent, or Firm* — Procopio Cory Hargreaves and Savitch LLP

(57) ABSTRACT

A valve for dispensing fluid as a bead or a dot having a housing with an internal cavity and a disposable insert positioned within the cavity of the housing having a fluid inlet, a fluid chamber, a fluid outlet and a diaphragm adjacent the fluid chamber between the fluid inlet and the fluid outlet. The replaceable insert further has a latching mechanism adjacent the diaphragm for receipt of a reciprocating actuator to actuate the diaphragm to dispense fluid from the fluid chamber.

20 Claims, 3 Drawing Sheets

(56) References Cited

U.S. PATENT DOCUMENTS

| | | | | |
|---|---|---|---|---|
| 5,004,011 A * | 4/1991 | Linder | ............... | F16K 1/523 |
| | | | | 137/556 |
| 5,344,292 A * | 9/1994 | Rabenau | ............. | F04B 43/02 |
| | | | | 417/360 |
| 5,407,101 A | 4/1995 | Hubbard | | |
| 5,535,919 A | 7/1996 | Ganzer et al. | | |
| 5,564,606 A | 10/1996 | Engel | | |
| 5,931,355 A | 8/1999 | Jefferson | | |
| 6,234,358 B1 | 5/2001 | Romine et al. | | |
| 6,719,174 B1 | 4/2004 | Swift | | |
| 7,131,555 B2 * | 11/2006 | Maruyama | ............. | B05C 5/0225 |
| | | | | 222/1 |
| 7,331,482 B1 | 2/2008 | Fugere | | |
| 7,926,785 B2 | 4/2011 | Wincek | | |
| 8,141,585 B2 * | 3/2012 | Tschurtz | ............... | F16K 7/17 |
| | | | | 137/625.27 |
| 8,469,231 B2 | 6/2013 | Strecker | | |
| 8,528,598 B2 * | 9/2013 | Morgan | ............. | G05D 11/003 |
| | | | | 137/625.5 |
| 8,591,477 B2 | 11/2013 | Hieb et al. | | |
| 9,016,530 B2 | 4/2015 | Topf et al. | | |
| 2003/0168478 A1 * | 9/2003 | Speight | ................ | B67D 1/10 |
| | | | | 222/333 |
| 2004/0262562 A1 * | 12/2004 | Maula | ..................... | F16K 7/14 |
| | | | | 251/331 |
| 2006/0289825 A1 | 12/2006 | Winek | | |
| 2011/0140029 A1 | 6/2011 | Greif | | |
| 2012/0097880 A1 | 4/2012 | Boettcher et al. | | |
| 2012/0267561 A1 | 10/2012 | Samper et al. | | |
| 2014/0196797 A1 | 7/2014 | Dietel et al. | | |
| 2014/0217321 A1 | 8/2014 | Glime | | |
| 2014/0224335 A1 * | 8/2014 | Hofmann | ............. | B01J 19/0093 |
| | | | | 137/1 |

FOREIGN PATENT DOCUMENTS

| | | |
|---|---|---|
| CN | 102985734 A | 3/2013 |
| GB | 2 408 788 A | 6/2005 |
| JP | H11141713 A | 5/1999 |

OTHER PUBLICATIONS

Office action issued in parallel Canadian Application No. 2,911,684; dated Feb. 21, 2017; 4 pages.

The First Office Action for Chinese patent application No. 201510813348.7 dated May 2, 2018 in 16 pages.

* cited by examiner

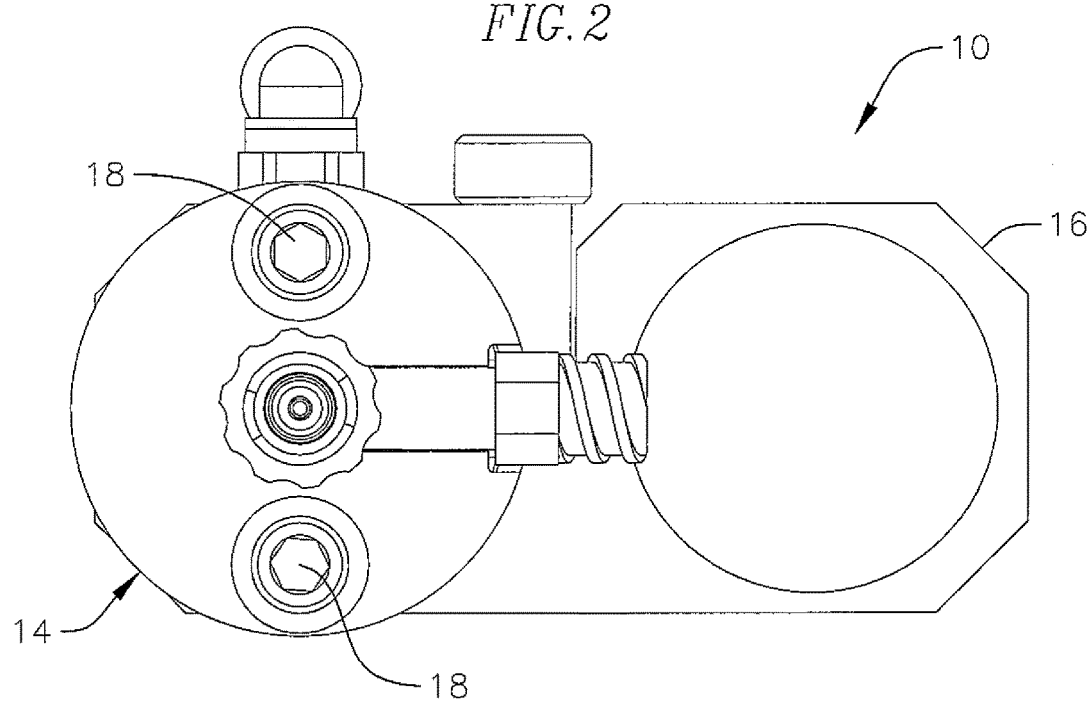
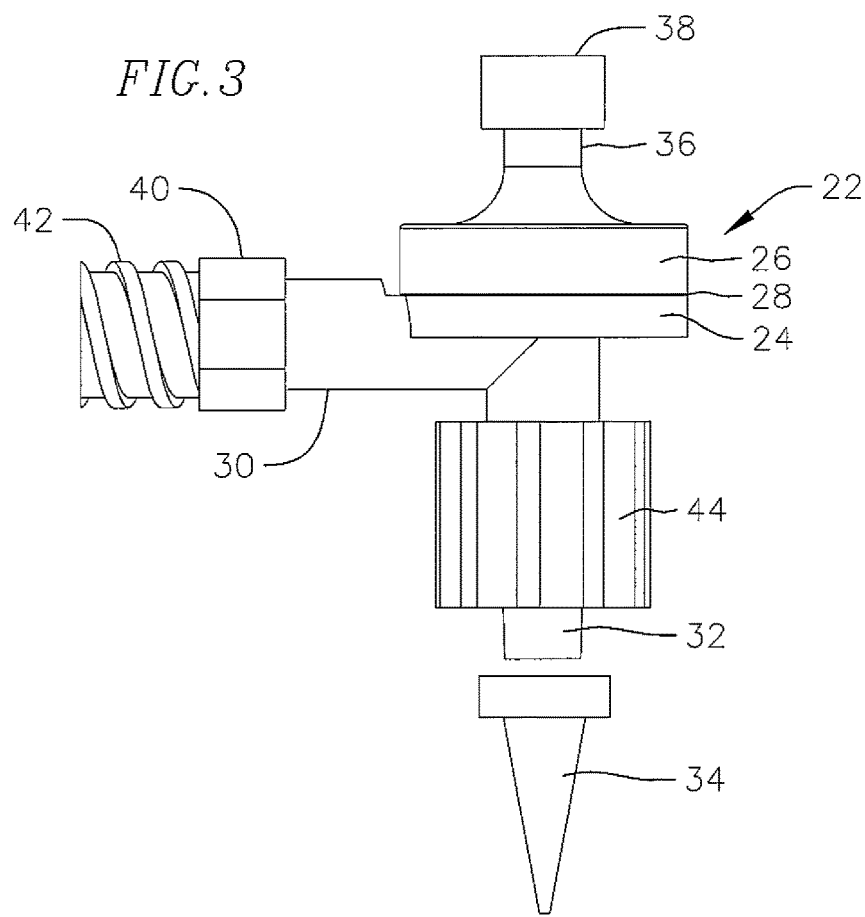

DISPOSABLE DIAPHRAGM VALVE

BACKGROUND OF THE INVENTION

The present invention relates to disposable valves and more particularly to an actuator controlled diaphragm valve having a valve insert made out of a moldable plastic having a fluid chamber and a diaphragm component capable of controlled, repeatable and accurate dispensing of fluid materials of various types and viscosities and in various forms, such as beads, dots and the like.

Positive displacement rotary microvalves are known for dispensing fluid materials such as adhesives, epoxies, potting compounds, SMT adhesives, two-part adhesives, silver and gold filled adhesives, UV curable adhesives, and solder pastes in a repeatable and accurate manner. Typically, these dispensers for fluid material are used in a wide variety of industries, such as electronic assembly and repair, form in place gasketing, component assembly and sealing, moldmaking, casting, tool and machine and equipment fabrication and assembly, and a variety of other uses.

Prior dispensing devices typically include a gear motor which controls the rotation of a feed screw supported in a housing. Fluid is fed to the housing from an external pressure on the fluid and to force the fluid material into the housing. Supported in the housing for rotation by the motor is a feed screw or auger which urges the fluid material into a dispensing tip which is affixed to the output end of the housing. The dispensing tip is essentially in the form of a pointless needle which is locked and sealed to the output end of the housing.

The valve includes a rotary screw of a variable pitch type which homogenizes low viscosity material and which compresses the material to reduce its volume. A one piece housing having a sleeve located in the bore and which extends only partly up the bore area. The housing also includes a passageway formed in the housing through which the fluid flows and which is in contact with the passage wall as the fluid is urged into the bore. The portion of the bore above the sleeve may be contacted with the fluid since there is no seal between the upper portion of the bore and the sleeve. The housing also includes a screw which holds a dispensing coupling and thus the sleeve and the bore, a gasket being provided between the dispensing coupling and the lower portion of the sleeve.

Although prior microvalve dispensers operate satisfactorily, there are circumstances which require improvements which can be made. For example, dispensers are normally used continuously in assembly line and commercial operations except during lunch breaks and after a shift is over. If the material being dispensed hardens in the microvalve or degrades for any reason, then the valve has to be cleaned out and this is a difficult operation. Should such hardening occur, the unit is often sent back to the supplier for cleaning and thus may be expensive and create considerable down time. In addition, materials being dispensed may change during operation and it may be the case that later dispensed material is contaminated by that previously dispensed or is incompatible with the previously dispensed material. In such a case, the contamination must be cleaned out of the valve, which also can lead to considerable expense and down time for cleaning.

Consequently, improvements to address these issues were developed such that all interior surfaces that come into contact with fluid being dispensed were readily replaceable therefore reducing costs of cleaning and repair and reducing down time in assembly and commercial operations. Such microvalve devices included a conventional gear driven motor unit to which was mounted a housing for the valve. Supported within the housing was a disposable insert chamber which forms the interior wet surfaces of the dispenser. The insert includes a feed arm through which fluid under pressure from an external source is fed to the interior of the insert and thus the fluid does not contact the feed arm surfaces of the housing of the microvalve. Located in the insert is a feed mechanism connected to and driven by the motor, to dispense a measured amount of fluid accurately and controlled by the motor. Such prior disposable inserts required a motor having and output shaft for driving a helical screw or auger supported for rotation in the insert. Fluid in a measured amount, depending on the rotational speed and configuration of the screw was urged out of the outlet which forms the exit passageway for the insert. Although such disposable rotary microvalve insert configuration works well, having to include a helical screw or auger supported for rotation within the insert is a complicated mechanism adding to the complexity and expense of the insert which is disposable. Consequently a need exists for a simplified disposable valve insert which is less expensive to manufacture yet provides consistent and reliable performance.

SUMMARY OF THE INVENTION

The present invention is directed to a disposable actuator controlled diaphragm valve insert which addresses the drawbacks of prior disposable insert designs. The present invention provides a relatively simple microvalve structure in which all of the interior surfaces which come into contact with the fluid being dispensed are readily replaceable therefore reducing cost of cleaning and repair in reducing down time in assembly in commercial operation.

In accordance with the present invention, the microvalve includes an actuator unit to which is mounted a housing for the valve. Supported within the housing is the disposable insert chamber which forms the interior wet surfaces of the dispenser. The valve insert includes a body section through which the fluids such as adhesives, epoxies, solder paste, etc. are accurately dispensed as a dot or bead. The disposable insert is made out of a moldable or machinable plastic compound and includes both a fluid chamber and a diaphragm component which are joined and sealed together by either ultra-sonic, laser or spin welding processes or they can be glued or snap-fitted together. The insert has fluid inlet and outlet passages which extend beyond the valve body. Attached to the outlet passage is a removable and replaceable dispensing tip.

When the insert is installed into the valve body, the diaphragm head is engaged with an actuator. When the actuator is reciprocating, the diaphragm will move in the same motion and thus fluid will be dispensed.

A latching feature may be provided on the diaphragm component with a screw, rod or other material insert for added strength. The diaphragm component can be made with additives in the base moldable plastic to change the strength and compliance of the diaphragm component. Additionally, the fluid chamber component is made of a material which facilitates the joining of the fluid chamber and diaphragm components.

These and other aspects and advantages of the present invention will become apparent with the following specification, which, together with the accompanying drawings describes and illustrates embodiments of the invention.

BRIEF DESCRIPTION OF THE DRAWINGS

FIG. 2 is a bottom view of the dispenser of FIG. 1;

FIG. 3 is a side view of the disposable valve insert of FIG. 1; and

DETAILED DESCRIPTION OF THE INVENTION

Figure 1:
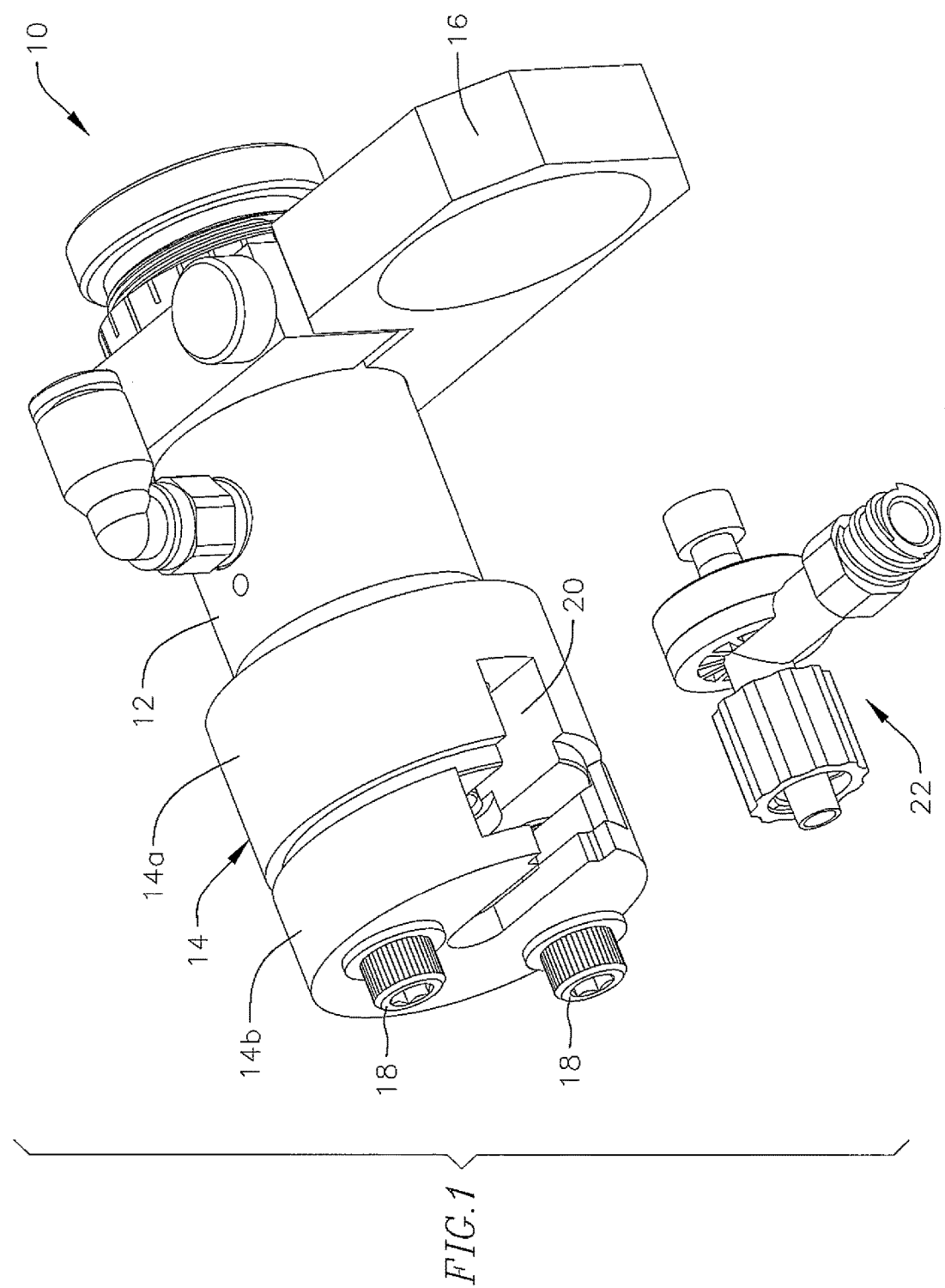
FIG. 1 is an exploded perspective view of the microvalve dispenser of the present invention.

As shown in FIGS. 1 through 3, a microvalve dispenser assembly 10 is illustrated. The assembly includes an actuator 12 having a housing 14 mounted thereon. A mounting bracket 16 is supported by the actuator for mounting various dispensed material sources. The actuator may be any one of either a pneumatic or hydraulic driven type or direct current servo or stepper motor type. The actuator may be controlled by a controller mechanism (not shown).

The housing 14, which may be of metal such as aluminum, or a corrosion resistant plastic such as acetal, for example, may be made up of a main body housing 14a and a body front plate 14b held together by captive screws 18. The main body housing 14a and the front body plate 14b cooperate to form an internal cavity 20 for receipt of a disposable diaphragm valve insert 22. The insert 22 includes a fluid chamber component 24 and a diaphragm component 26. The fluid chamber and the diaphragm components include a joint 28 for joining and sealing the components together by either an ultra-sonic, laser or spin welding process or are snap-fitted or glued together. The valve insert is preferably made out of a moldable or machinable plastic compound. The insert includes a fluid inlet passage 30 and a fluid outlet passage 32. The outlet passage 32 has a removable and replaceable dispensing tip 34. The diaphragm component 26 includes a latching feature 36 having an enlarged head portion 38.

The fluid inlet passage 30 includes an outer circumferential shoulder 40 which extends beyond the housing and body front plate 14b thus preventing rotational movement of the insert relative to the housing. The outer surface is threaded 42 so that a fluid supply source may be easily attached and removed. Similarly the fluid outlet passage 32 has a shoulder portion 44 which extends beyond a lower surface of the body front plate 14b. Shoulder 44 assists in attaching the dispensing tip securely.

Figure 4:
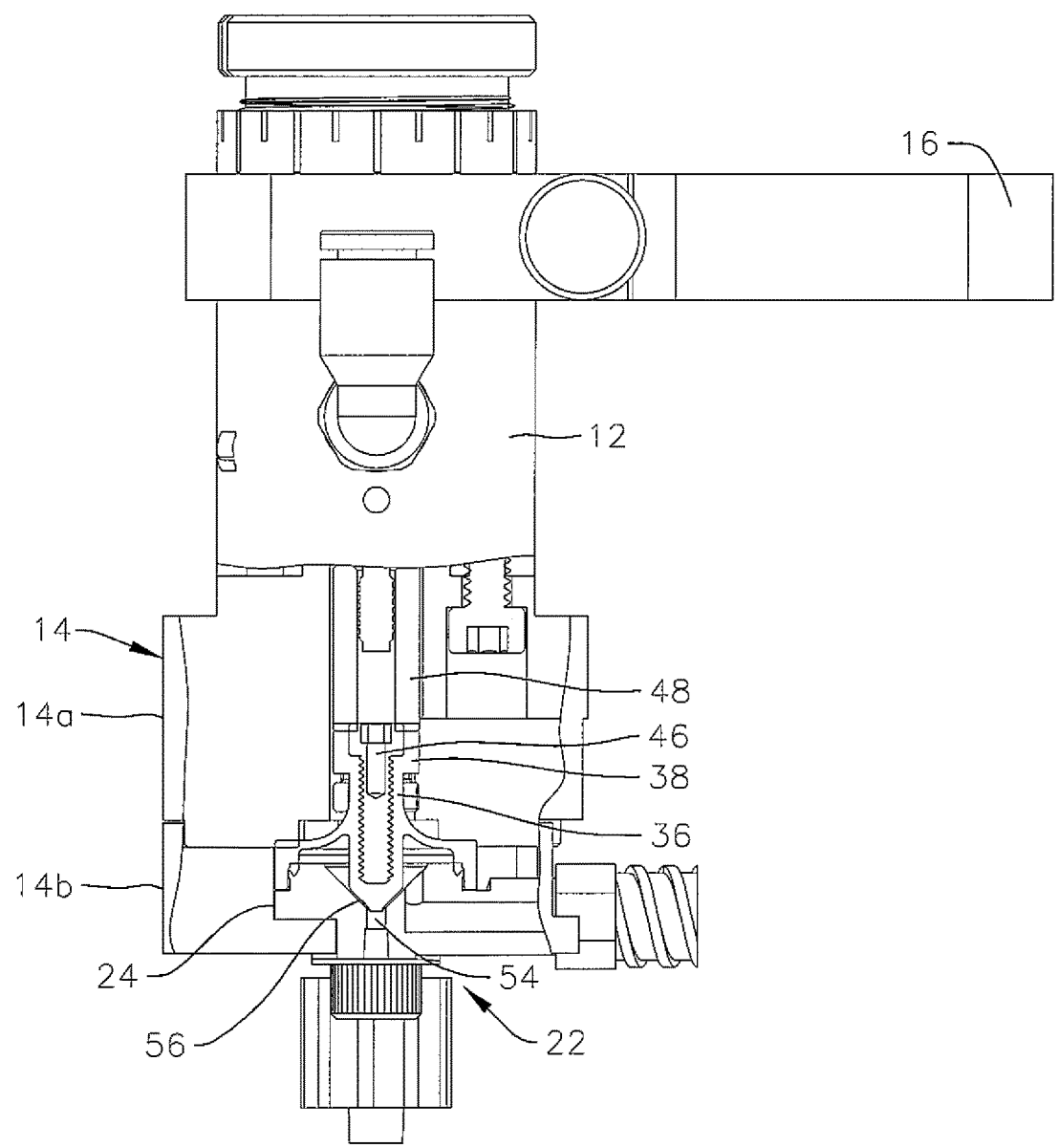
FIG. 4 is a side view of the dispenser of FIG. 1 illustrated in partial section.

As seen best in FIG. 4, when the disposable diaphragm valve insert 22 is positioned within the cavity 20 of the housing 14 the head portion 38 of the latching feature 36 is engaged with a chuck 48 which is driven by the actuator 12. The latching feature 36 can include an additional strength feature such as a screw 46 which could also be a rod or other material insert. The sealing feature 56 of the diaphragm component 26 is positioned between the latching mechanism and the fluid chamber component 24 such that when the chuck 48 is reciprocating the diaphragm moves in the same motion to dispense a fluid. The fluid is dispensed by the diaphragm opening and closing the fluid path 54 as fluid is being pumped in the inlet under pressure. The diaphragm can be made with or without additives in the base moldable or machinable plastic material to change the strength and compliance of the diaphragm as needed based upon the fluid being dispensed. The diaphragm 26 and the feed chamber 24 can be made of various materials such that the feed chamber and the diaphragm can be joined and sealed together. Additives to either the base moldable plastic material or the diaphragm can be fiberglass, glass beads, carbon fiber or elasticizers Although the present invention has been described and illustrated with respect to various embodiments thereof, it is to be understood that changes and modifications can be made herein which are within the full intended scope of the invention as hereinafter claimed.

What is claimed is:

1. A valve assembly for dispensing fluid as a bead or a dot comprising:
    a housing having an internal cavity;
    a reciprocating actuator; and
    a disposable replaceable insert positioned within the cavity of the housing having interior surfaces which come into contact with the dispensing fluid, a fluid inlet, a fluid chamber and a fluid outlet,
    wherein the disposable replaceable insert further has a diaphragm adjacent the fluid chamber between the fluid inlet and the fluid outlet which when engaged by the reciprocating actuator opens and closes a fluid path in the fluid chamber between the fluid inlet and the fluid output for dispensing fluid, and the disposable replaceable insert, as an assembled unit, being readily replaceable with a different disposable diaphragm valve insert, as an assembled unit.

2. The valve assembly of claim 1 wherein the replaceable insert further includes a latching feature adjacent the diaphragm opposite the fluid chamber.

3. The valve assembly of claim 2 wherein the reciprocating actuator extends through the latching member to actuate the diaphragm to dispense fluid from the fluid chamber.

4. The valve assembly of claim 2 wherein the latching mechanism has a reinforcing member positioned therein.

5. The valve assembly of claim 1 wherein the diaphragm is made of a plastic having strength and compliance additives.

6. The valve assembly of claim 1 wherein the fluid chamber and the diaphragm are sealed together by welding.

7. The valve assembly of claim 1 wherein the fluid chamber and the diaphragm are joined and sealed by spin welding, laser welding, ultra-sonic welding, thermal compression, snap-fitting or by glue.

8. The valve assembly of claim 1 further comprising a pneumatic device attached to the housing to drive the actuator.

9. The valve assembly of claim 1 wherein the fluid inlet and the fluid outlet extend beyond the housing and further comprise a removable dispensing tip attached to the fluid outlet.

10. The valve assembly of claim 1 wherein the housing comprises a main housing body and a front plate removably connected together to form the internal cavity.

11. The valve assembly of claim 1 wherein the fluid outlet is a single fluid outlet.

12. A disposable diaphragm valve insert positioned within a housing of a fluid dispensing assembly comprising:
    interior surfaces which come into contact with a dispensing fluid;
    a fluid inlet;
    a fluid chamber for receipt of fluid from the fluid inlet;
    a fluid outlet for exiting of fluid out of the fluid chamber;
    a flexible diaphragm positioned above the fluid chamber for opening and closing a fluid path between the fluid inlet and the fluid outlet; and
    a latching feature adjacent the diaphragm opposite the fluid chamber, wherein the disposable replaceable insert, as an assembled unit, being readily replaceable with a different disposable diaphragm valve insert, as an assembled unit.

13. The insert of claim 12 wherein a latching feature has a reinforcing member located therein.

14. The insert of claim 12 wherein the diaphragm is made of a plastic having strength and compliance additives.

15. The insert of claim 12 wherein the fluid chamber and the diaphragm are sealed together by welding.

16. The insert of claim 15 wherein the fluid chamber and the diaphragm are welded by spin welding, laser welding, ultra-sonic welding, thermal compression, snap-fitting or by glue.

17. A method of dispensing fluid in a bead or a dot through a fluid dispensing valve assembly comprising a housing having a disposable diaphragm valve insert with interior surfaces which come into contact with a dispensing fluid, comprising the steps of:
positioning the disposable diaphragm valve insert into an internal cavity of the housing;
introducing fluid into a fluid chamber in the disposable diaphragm valve insert;
reciprocating an actuator to engage and disengage a diaphragm within the disposable diaphragm valve insert to move the diaphragm through the fluid chamber;
dispensing the fluid when the actuator is disengaged with the diaphragm; and
replacing the disposable diaphragm valve insert, as an assembled unit, with a different disposable diaphragm valve insert, as an assembled unit.

18. The method of claim 17 wherein the step of introducing fluid into the disposable valve insert includes directing fluid under pressure through a valve inlet into the fluid chamber in the disposable diaphragm valve insert.

19. The method of claim 18 wherein the step of dispensing the fluid is through a fluid outlet connected to the fluid chamber.

20. The method of claim 17 wherein the fluid dispensed is an adhesive, epoxy, potting compound or solder paste.

* * * * *